Oct. 24, 1933.  C. W. GIRVIN  1,931,725
METHOD OF TREATING REFINED PETROLEUM PRODUCTS
Filed July 6, 1927
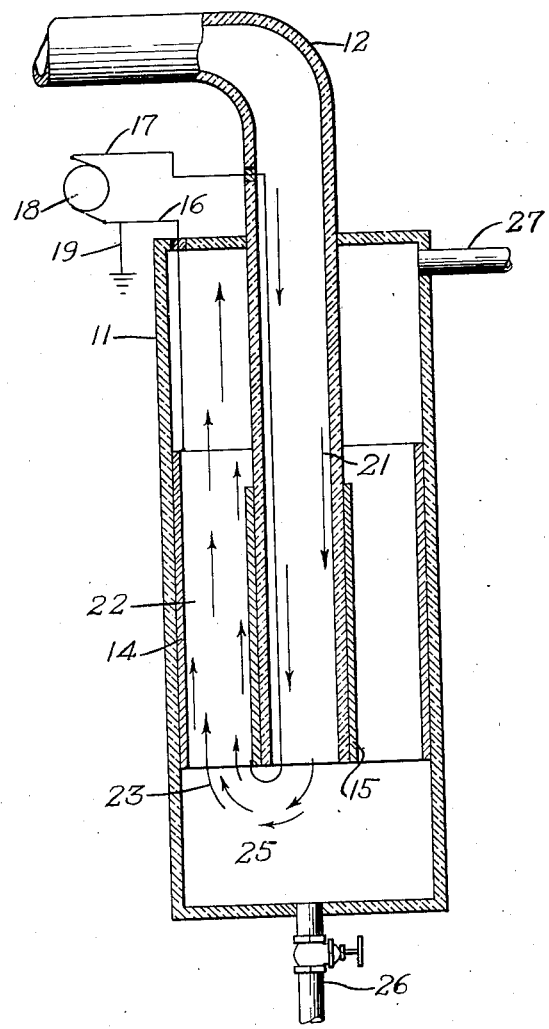
INVENTOR:
CHARLES W. GIRVIN,
BY Ford W Davis
ATTORNEY.

Patented Oct. 24, 1933

1,931,725

UNITED STATES PATENT OFFICE 1,931,725

METHOD OF TREATING REFINED PETROLEUM PRODUCTS

Charles W. Girvin, Long Beach, Calif., assignor to Petroleum Rectifying Company of California, Los Angeles, Calif., a corporation of California Application July 6, 1927. Serial No. 203,748

10 Claims. (Cl. 204—24)

This invention relates to the preparing of petroleum products for marketing.

In the oil producing industry, gasoline, lubricating oils and other petroleum products are separated from the other fractions of the petroleum by distillation processes. Most of the refined products thus obtained are not in a marketable condition but require chemical treatment to remove foreign matter such as resinous substances and hydrocarbons of the unsaturated and aromatic groups which impart a dark color and unpleasant smell to the product. The conventional chemical treatment consists of treating the product with sulphuric acid $H_2SO_4$, and then with sodium hydroxide NaOH to neutralize the acid. The product is then washed to remove the last traces of NaOH. The acid and alkali are usually mixed with the product to be treated in a manner so that an emulsion of acid in said product or alkali in said product is formed. The acid or the alkali, which are the dispersed phase in the emulsion, are very slow to separate from the product by the action of gravity.

It is an object of this invention to provide a more rapid method of separating the dispersed phase from the type of emulsion outlined in the foregoing.

Another object of the present invention is to provide a method of treating a petroleum product by mixing this product with a suitable treating agent and subsequently, and without further chemical treatment, separating the constituents by use of a uni-directional electric field.

Further objects of the invention lie in a novel process of removing suspended matter from a petroleum product by the application thereto of a uni-directional electric field of special characteristics, and in a process wherein separation takes place in the electric field.

Other objects and advantages of this invention will be pointed out in the following description.

In the accompanying drawing I illustrate a form of apparatus in which the method of this invention may be accomplished. It should be understood that I do not intend to limit myself in any way to the particular design of apparatus illustrated, since other designs may be utilized. In the drawing the numeral 11 represents a shell which is formed of an insulation material such as glass. Extending into the shell 11 from the upper end thereof is a tube 12 which is also formed of an insulation material. Emulsion in which a petroleum product such as spirits or lubricating oil comprises the continuous phase is delivered to the interior of the shell 11 through the tube 12. Placed in the shell 11 is an outer electrode 14 which surrounds the lower part of the tube 12. The outer electrode 14 is in contact with and supported by the shell 11. An inner electrode 15 is placed at the lower end of the tube 12, this inner electrode 15 engaging and being supported by the tube 12. The two electrodes are connected by electrical conductors 16 and 17 to a source of electrical energy 18, which supplies a direct current to the electrodes. The conductor 16 is preferably grounded as shown at 19. I have found that better results may be obtained when the inner electrode 15 is the negative electrode and when the outer electrode 14 is the positive electrode. It should be noted that the field produced between the inner and outer electrodes is of non-uniform voltage gradient, due to the concentric nature of these electrodes, so that if the inner electrode is made negative the voltage gradient adjacent this electrode will be greater than that adjacent the outer electrode. Although my invention may be utilized in separating the constituents of various emulsions, it is particularly useful in removing a chemical treating agent from petroleum spirits and its operation for this purpose may be described as follows:

The spirit emulsion to be treated passes downward through the tube 12 as indicated by arrows 21, passing from the lower end thereof into a treating space 22 formed between the electrodes 14 and 15, as indicated by arrows 23. The generator 18 at this time is set into operation so that an electric potential is established. This sets up a direct current electric field in the treating space 22 to the action of which the emulsion is subjected. In this emulsion the petroleum product is the continuous phase and drops of a water solution of a chemical comprise the dispersed phase. The effect of the D. C. field is to precipitate the drops of solution on one or the other of the electrodes where these drops unite to form a layer of liquid. This layer, due to the continuous, unidirectional flow of the D. C., lies flat against the electrode upon which it forms until its greater specific gravity causes it to sink down off the lower end of the electrode into a settling space 25 in the lower end of the shell 11 from which it can be drawn off from time to time through a valved pipe 26. The electrode toward which these particles move is dependent upon the inherent charge on the dispersed particles. If a dispersed particle has a positive charge, it will move toward and into contact with the negative electrode, but if negatively charged, it will move toward the positive electrode as is well known in the art. In the separation of a chemical agent from a petroleum product such as gasoline, etc., the dispersed particles are positively charged and thus move into contact with the negative or central electrode.

The vertical length of the electrodes 14 and 15 is sufficient to insure that the spirit is entirely free from water particles by the time it reaches the top of the space between the electrodes. The spirit, thus completely freed from the chemical agent, is drawn from the upper portion of the shell 11 through a pipe 27 provided therein.

I am aware that crude oil emulsions have been previously dehydrated by passing them through an electric field. However, alternating current alone has been found to have an action upon crude oil emulsions while if alternating current is used in my process, practically no effect whatever is had upon the emulsion in which a refined product of petroleum comprises the continuous phase. The action of my process is therefore in no sense a "treating action," as involved in the ordinary dehydration of emulsions, but an actual electrical precipitation of the liquid particles of the dispersed phase against the surface of the electrodes.

The D. C. voltage which I have found most effective is 6000 volts per inch.

The process delineated in the foregoing part of this description is effective in completely removing the acid or alkali from a spirit product. The principal use of this invention is in the treatment of gasoline which, because of its usage, must be in as pure a form as possible. In thus treating gasoline the chemical treating agent added may comprise either an acid or an alkali. Thus, if the gasoline is agitated with an acid, this acid can be directly and completely removed without the necessity of neutralization, or, if the gasoline is originally mixed with an alkali, this alkali can be directly removed from the gasoline without subsequent treatment.

I claim as my invention:

1. A method of purifying a refined petroleum product which comprises: subjecting said product to the action of an electric field of greater voltage gradient toward the negative electrode than toward the postive electrode, said field being produced by a unidirectional electric current, the impurities in said product being moved under the influence of said field and collected on one of said electrodes; and allowing said impurities to remain in contact with said electrode and settle by gravity therealong.

2. A method of purifying a refined petroleum product, which includes the step of moving said product in a given direction through an electric field produced by a uni-directional electric current in a manner to collect certain of the particles in said product on one of the electrodes forming said field, said movement in said given direction taking place at such a rate that the collected particles may move along said electrode in a counter direction due to a difference in density between the material forming these particles and the remaining product.

3. A process of treating a refined petroleum product by the use of a pair of electrodes, which method includes the steps of: mixing said refined petroleum product with acid; subsequently mixing the acid-treated pertoleum product with a base whereby an emulsion is formed in which said petroleum product is the continuous phase; setting up a uni-directional electric field between said electrodes and of greater intensity adjacent the negative electrode than adjacent the positive electrode; and subjecting said emulsion to said field whereby the dispersed phase thereof is agglomerated.

4. A method of purifying a refined petroleum product, which includes the steps of: intimately mixing said refined petroleum product with a chemical treating agent to form a non-neutral emulsion in which said chemical treating agent is the dispersed phase; thereafter, and without subsequent chemical treatment of said emulsion, subjecting said emulsion to the action of uni-directional electric field to draw the particles of said chemical agent forming said dispersed phase into contact with one of the electrodes forming said field whereby separation is effected in said electric field; removing from said field the treating agent contacting said one of said electrodes; and removing the treated petroleum product from said field.

5. A method of purifying a refined petroleum product, which includes the steps of: intimately mixing said refined petroleum product with a chemical treating agent to form a non-neutral emulsion in which said chemical treating agent is the dispersed phase; immediately, and without subsequent neutralization of said emulsion, subjecting said emulsion to the action of a uni-directional electric field of the order of magnitude of several thousand volts per inch to draw the particles of said chemical agent forming said dispersed phase into contact with one of the electrodes forming said field whereby separation is effected in said electric field; removing the treating agent contacting said one of said electrodes from said field; and removing the treated petroleum product from said field.

6. A method of treating an emulsion the continuous phase of which comprises a petroleum product and the dispersed phase of which consists of an acid or an alkali, which method consists in subjecting said emulsion to the action of a uni-directional electric field of the order of magnitude of several thousand volts per inch whereby the particles forming the dispersed phase move to and agglomerate on one of the electrodes forming said field.

7. A method of treating an emulsion in which a refined petroleum product is the continuous phase and a chemical treating agent is the dispersed phase, which method includes the steps of: moving said emulsion into a uni-directional electric field which is of greater intensity adjacent the negative electrode than adjacent the positive electrode whereby the particles of said treating agent move toward and into contact with one of said electrodes thereby effecting a separation of said emulsion while in said electric field; and separately removing said refined petroleum product and said treating agent from opposite ends of said electric field.

8. A method of treating gasoline, which includes the steps of: intimately mixing said gasoline with a chemical treating agent to form a non-neutral emulsion in which said chemical treating agent is the dispersed phase; and immediately thereafter, and without subsequent neutralization, subjecting said emulsion to the action of a uni-directional electric field to move the particles of said chemical treating agent toward and into contact with one of the electrodes forming said field whereby the treating agent is removed from said gasoline.

9. A method as defined in claim 8 in which the intensity of said electric field is greater adjacent the negative electrode than adjacent the positive electrode.

10. A method as defined in claim 8 in which the intensity of said electric field is greater adjacent the negative electrode than adjacent the positive electrode, and including the step of separately removing said gasoline and said treating agent from said field.

CHARLES W. GIRVIN.